United States Patent
Savelli et al.

(10) Patent No.: US 6,175,262 B1
(45) Date of Patent: *Jan. 16, 2001

(54) BOOSTER CIRCUIT

(75) Inventors: Laurent Savelli, Meylan (FR); David Novosel, West Middlesex, PA (US)

(73) Assignee: SGS-Thomson Microelectronics S.A., Gentilly (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/001,600

(22) Filed: Dec. 31, 1997

(30) Foreign Application Priority Data

Dec. 31, 1996 (FR) .................................. 96 16381

(51) Int. Cl.⁷ ....................................... G05F 1/10
(52) U.S. Cl. ............................... 327/536; 365/226
(58) Field of Search ......................... 327/536, 537, 327/589; 365/226; 363/59, 60

(56) References Cited

U.S. PATENT DOCUMENTS

| 5,270,588 | 12/1993 | Choi ......................... 307/475 |
| 5,546,296 | 8/1996 | Savignae et al. ............... 363/60 |
| 5,757,228 | * 5/1998 | Furutani et al. .............. 327/589 |
| 5,796,293 | * 8/1998 | Yoon et al. ................... 327/536 |
| 5,812,017 | * 9/1998 | Golla et al. ................... 327/536 |
| 5,831,470 | * 11/1998 | Park et al. ................... 327/589 |

FOREIGN PATENT DOCUMENTS 0 727 869    8/1996  (EP) .................. H02M/3/07

OTHER PUBLICATIONS

"Charge Pump Circuit", IBM Technical Disclosure Bulletin, vol. 33, No. 4, Sep. 1990, pp. 147–148.

* cited by examiner

Primary Examiner—Jung Ho Kim
(74) Attorney, Agent, or Firm—Wolf, Greenfield & Sacks, P.C.; James H. Morris; Theodore E. Galanthay

(57) ABSTRACT

The present invention relates to a booster circuit including a first P-MOS transistor, the source of which is connected to a high voltage line; a second N-MOS transistor, the drain of which is connected to a first supply potential and the source of which is connected to the drain of the first transistor; a first capacitor connected between the gate of the first transistor and a terminal of reception of a first clock signal; a second capacitor connected between the gate of the second transistor and the reception terminal for the first clock signal; a third capacitor connected between the drain of the first transistor and a reception terminal for a second clock signal, complementary to the first clock signal; two precharge diodes the first capacitor from the high voltage line; and one precharge diode for the second capacitor.

32 Claims, 2 Drawing Sheets

BOOSTER CIRCUIT

BACKGROUND OF THE INVENTION

1. Field of the Invention

The present invention relates to a booster circuit especially meant for generating a voltage of control of the word lines of a dynamic memory.

2. Discussion of the Related Art

FIG. 1 shows two cells of a dynamic memory associated with a conventional booster circuit. Each cell includes a capacitor 10 connected between a fixed potential, such as a low supply potential GND, and the source of a MOS-type N-channel access transistor 12. The drains of the transistors 12 are connected to respective bit lines BL. The gates of the access transistor 12 associated with the cells forming a word are connected to a common word line WL. A word line WL is generally selected via a P-channel MOS transistor 14, the gate of which is controlled by a word selection signal WS. The drain of transistor 14 is connected to word line WL and the source of this transistor receives a selection voltage Vpp.

When a 1 is written into a cell, supply voltage Vdd of the memory is presented on the corresponding bit line BL and transistor 14 is turned on. Voltage Vpp is thus presented, without any drop, on word line WL, whereby the access transistors 12 are turned on.

For a memory cell to be able to keep a value 1 as long as possible, capacitors 10 should be changed to the highest possible value, that is, to value Vdd of the supply voltage. Thus, voltage Vpp applied on the gates of transistors 12 must be higher than or equal to Vdd+Vt, where Vt is the gate-source threshold voltage of transistors 12. This is what the booster circuit enables to obtain.

The booster circuit of FIG. 1 includes a capacitor 16, a terminal of which is connected to ground GND and the other terminal of which, providing voltage Vpp, is connected to the cathodes of two diodes 18 and 19. The anodes of diodes 18 and 19 are connected to potential Vdd by two respective N-channel MOS transistors 21 and 22. The gate of transistor 22 is connected to the anode of diode 18, while the gate of transistor 21 is connected to the anode of diode 19. A capacitor 24 is connected between the anode of diode 18 and a terminal receiving a clock signal CK. A capacitor 25 is connected between the anode of diode 19 and a terminal receiving a clock signal CK*, complementary to signal CK.

Such a booster circuit supplies a voltage Vpp equal to 2Vdd−Vt in the steady state, value Vt being the threshold of diodes 18 and 19 which are generally formed of diode-connected MOS transistors.

During a first half clock period, signal CK is on zero and signal CK* is on 1 (at potential Vdd). The anode of diode 19, as indicated, is at a potential 2Vdd since capacitor 25 has been charged to Vdd during the preceding half-period. If the voltage of capacitor 16 is lower than 2Vdd−Vt, loads are transferred from capacitor 25 to capacitor 16 via diode 19, which tend to restore the voltage of capacitor 16 to 2Vdd−Vt.

Transistor 21 is on and is likely to provide, on its source, and thus on the anode of diode 18, a potential 2Vdd−Vt. The drain of transistor 21 being connected to potential Vdd, transistor 21 only provides, as indicated, potential Vdd to the anode of diode 18 and charges capacitor 24 to Vdd. The gate-source voltage of transistor 22 being negative, transistor 22 is nonconductive.

During the second half clock period, the states of the nodes are symmetrical, that is, signals CK and CK* and the anodes of transistors 18 and 19 are respectively on Vdd, 0, 2Vdd, and Vdd. Transistor 21 is then nonconductive and transistor 22 is on.

It appears that, in this booster circuit, as in other conventional booster circuits, such as that described in U.S. Pat. No. 5,406,523, the gates of N-channel MOS transistors receive a voltage which is substantially twice as high as the supply voltage of the circuit. This is unacceptable if it is desired to implement a dynamic memory in recent CMOS technologies, since the gate oxides are particularly thin and are likely to breakdown if the gate voltage exceeds the supply voltage of the circuit by a large amount. The breakdown risk essentially concerns N-channel MOS transistors since their substrate is connected to ground GND and the breakdown depends on the gate-substrate voltage. The problem is less critical for P-channel MOS transistors, the well of which can be freely connected to any potential.

SUMMARY OF THE INVENTION

Thus, an object of the present invention is to provide a booster circuit in which the gate voltages of the MOS transistors can be limited to values acceptable in recent CMOS technologies.

To achieve this and other objects, the present invention provides a booster circuit including a first MOS transistor of a first conductivity type, the source of which is connected to a high voltage line; a second MOS transistor of a second conductivity type, the drain of which is connected to a first supply potential and the source of which is connected to the drain of the first transistor; a first capacitor connected between the gate of the first transistor and a reception terminal for a first clock signal; a second capacitor connected between the gate of the second transistor and the reception terminal for the first clock signal; a third capacitor connected between the drain of the first transistor and a reception terminal for a second clock signal, complementary to the first clock signal; a first one-way precharge means for the first capacitor from the high voltage line, ensuring, during a precharge, that a voltage sufficient to turn on the first transistor is established; and a second one-way precharge means for the second capacitor.

According to an embodiment of the present invention, the first precharge means includes two diodes connected in series between the source and the gate of the first transistor and the second precharge means includes a diode connected between the drain and the gate of the second transistor.

According to an embodiment of the present invention, the circuit includes means for limiting the gate voltage of the second transistor.

According to an embodiment of the present invention, the limiting means is a diode connected in antiparallel to the second precharge means.

According to an embodiment of the present invention, the circuit includes a diode, connected in antiparallel to the first precharge means for limiting the gate voltage of the first transistor.

According to an embodiment of the present invention, the high voltage line exhibits a high capacitance with respect to that of the third transistor.

According to an embodiment of the present invention, the second clock signal exhibits at least one delayed edge with respect to a corresponding edge of the first clock signal.

According to an embodiment of the present invention, the circuit includes a comparator connected to stop an oscillator providing the first and second clock signals when the high voltage reaches a predetermined threshold.

The foregoing objects, features and advantages of the present invention, will be discussed in detail in the following non-limiting description of specific embodiments in connection with the accompanying drawings.

Detailed Description

Figure 1:
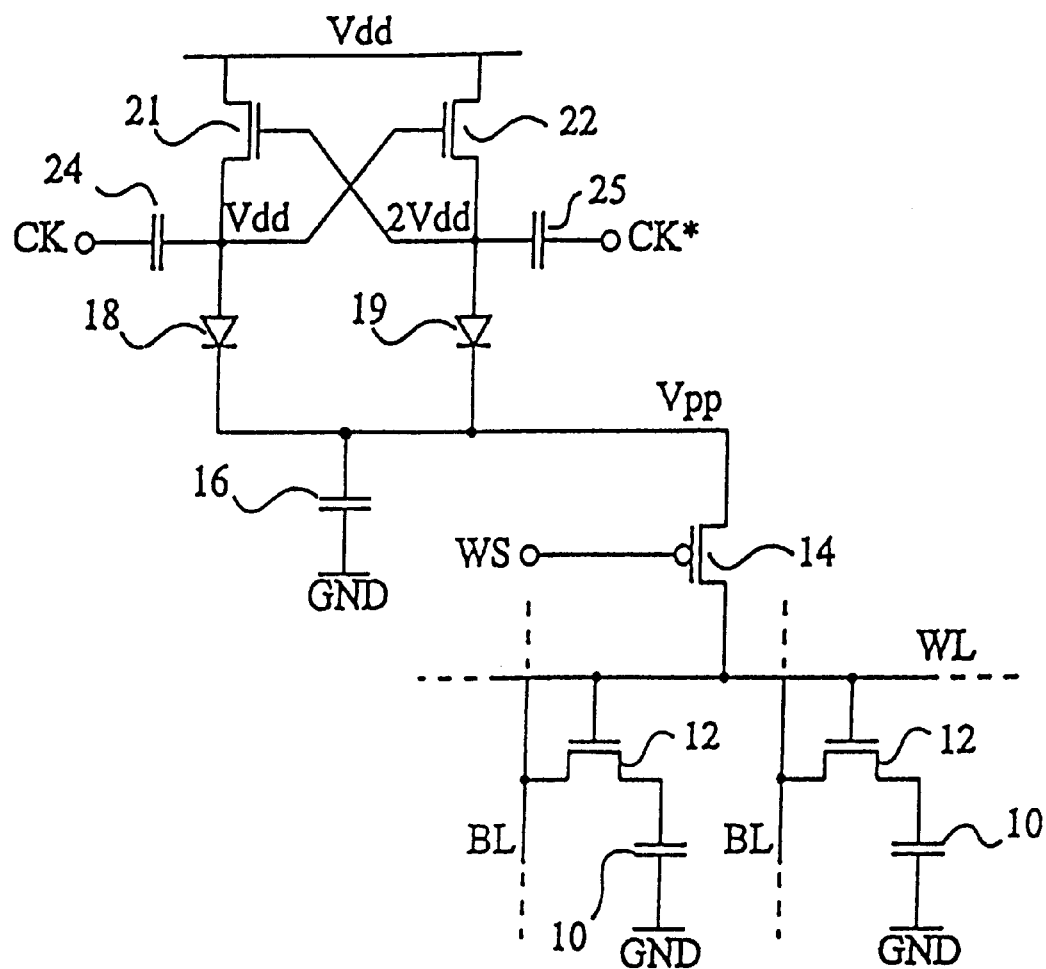
FIG. 1, previously described, shows a conventional booster circuit for supplying a voltage of control of word lines in a dynamic memory.
Figure 2:
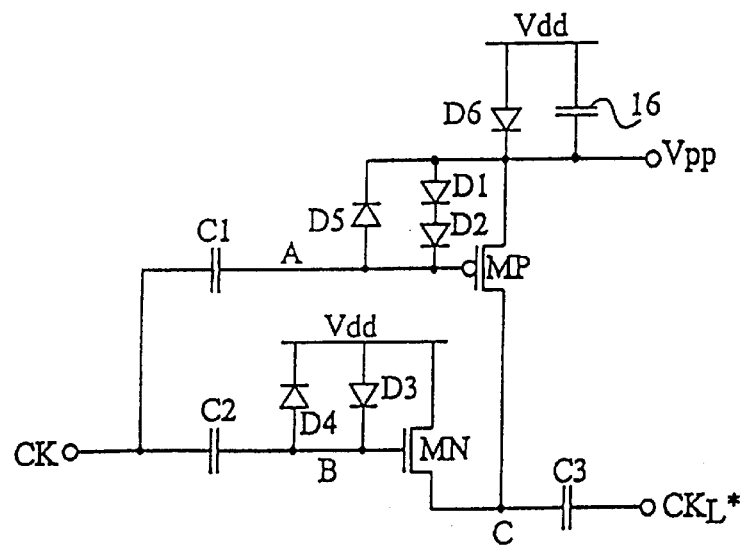
FIG. 2 shows an embodiment of booster circuit according to the present invention.

The booster circuit of FIG. 2 includes a P-channel MOS transistor MP, the source of which is connected to a line supplying high voltage Vpp. A capacitor C1 is connected between the gate of transistor MP and a terminal of application of a clock signal CK. As in FIG. 1, line Vpp is connected to a storage capacitor 16. This capacitor 16 is further connected, preferably, to high supply potential Vdd.

The drain of an N-channel transistor MN is connected to supply potential Vdd. A capacitor C2 is connected between the gate of transistor MN and the terminal for application of signal CK. The source of transistor MN is connected to the drain of transistor MP and to a terminal of a capacitor C3, the other terminal of which receives a clock signal $CK_L^*$, complementary to clock signal CK.

Two diodes D1 and D2 are connected in series between line Vpp and the gate of transistor MP, the anodes being on the side of line Vpp. These diodes are used to precharge capacitor C1 from line Vpp. At least two precharge diodes D1 and D2 are preferably provided to ensure that the gate-source voltage of transistor MP can become clearly lower than the (negative) threshold voltage of transistor MP so that this transistor is sufficiently conductive.

A diode D3 is connected by its anode to potential Vdd and by its cathode to the gate of transistor MN to precharge capacitor C2 from potential Vdd.

The diodes are in practice made from MOS transistors and exhibit a gate-source threshold Vt of a MOS transistor.

Hereafter, the node to which the gate of transistor MP is connected will be referred to as A, the node to which the gate of transistor MN is connected will be referred to as B, and the node to which the source of transistor MN (or the drain of transistor MP) is connected will be referred to as C.

In the steady state, during a first half clock period, signal CK is zero and signal $CK_L^*$ is Vdd. Capacitor C1, having a value significantly lower than that of capacitor 16, charges to Vpp−2Vt through diodes D1 and D2. Transistor MP is turned on by the presence of a source-gate voltage of 2Vt imposed by diodes D1 and D2. Capacitor C2 charges to Vdd−Vt through diode D3. Since capacitor C3 has been charged to Vdd during the preceding half-period, node C tends to reach value 2Vdd. Loads are transferred from capacitor C3 to capacitor 16 via transistor MP, causing an increase in potential Vpp towards 2Vdd. Potential Vpp being higher than potential Vdd−Vt, the gate-source voltage of transistor MN is negative or null, whereby transistor MN is nonconductive.

During the second half-period, signal CK is Vdd and signal $CK_L^*$ is zero. The potentials of nodes A and B increase by Vdd, while the potential of node C decreases by Vdd. Diodes D1 and D3 are reverse-biased, transistor MP is nonconductive and transistor MN turns on. Since the gate voltage of transistor MN is higher than potential Vdd+Vt, node C is forced to the drain potential of transistor MN, that is, to Vdd. Thus, capacitor C3 charges to Vdd.

The maximum value of voltage Vpp is 2Vdd. Thereby, node A can reach a maximum value of 3Vdd−2Vt. Node B can reach a maximum value of 2Vdd−Vt.

The circuit of FIG. 2 appears to effectively act as a booster. However, if it is desired to be used in recent CMOS technology, the gate voltage reached for transistor MN is too high (2Vdd−Vt). To limit this gate voltage to a suitable value, it is enough, as is shown, to connect a diode D4 in antiparallel to diode D3. In this case, the operation just described is maintained entirely, except that the maximum value reached by node B is Vdd+Vt, which becomes acceptable. If voltage Vpp is equal to 2Vdd, the maximum gate voltage of 3Vdd−2Vt is acceptable for transistor MP, provided that its well is connected to line Vpp.

Voltage Vpp, if it is meant to control the gates of the transistors of access to a memory also implemented in recent CMOS technology, will preferably be limited to Vdd+Vt, which is a value which, while being tolerable, still enables to charge the capacitors of the memory cells to the desired value Vdd.

To accelerate the switching of transistor MP, a diode D5 connected in antiparallel to diodes D1 and D2 can be provided, as is shown. The gate potential of transistor MP then varies between Vpp+Vt and Vpp−2Vt without altering the operation of the booster circuit.

The following table summarizes the voltages present on the several nodes of the circuit of FIG. 2 in steady state.

| CK | $CK_L^*$ | A | B | C | Vpp |
|---|---|---|---|---|---|
| 0 | Vdd | Vpp − 2Vt | Vdd − Vt | 2Vdd | 2Vdd |
| Vdd | 0 | Vpp + Vt | Vdd + Vt | Vdd | 2Vdd |

To accelerate the starting of the circuit, a diode D6 connected by its anode to potential Vdd and by its cathode to line Vpp can be provided, as is shown. This diode precharges capacitor 16 to Vdd−Vt upon circuit power-on.

As an example, capacitors C1 to C3 and 16 can respectively have values 0.2 pF; 0.4 pF; 3 pF; and 30 pF.

Figure 3:
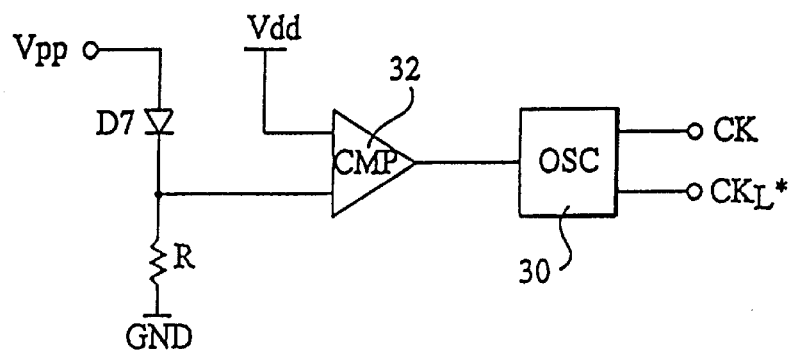
FIG. 3 illustrates an example of regulation circuit associated with the booster circuit of FIG. 2.

FIG. 3 shows a regulation circuit enabling to obtain the desired voltage Vpp, for example Vdd+Vt, to control the word lines of a dynamic memory. It will be preferred to adopt such a regulation circuit rather than to provide a static limiter of voltage Vpp. Indeed, such a static limiter would absorb a significant part of the loads supplied by capacitor C3 at each clock period and would cause high current consumption.

The clock signals in phase opposition CK and $CK_L^*$ are supplied by an oscillator 30 which is stopped or restarted according to the output of a comparator 32. A first input of comparator 32 receives potential Vdd. The second input of the comparator is connected to ground GND by a resistor R and to line Vpp by a diode D7, the anode of this diode being on the side of line Vpp.

With this configuration, as long as voltage Vpp is lower than Vdd+Vt, comparator 32 is in a first state which activates oscillator 30. Thus, voltage Vpp increases by successive load transfers between capacitor C3 and capacitor 16. Preferably, the value of capacitor C3 is low with respect to that of capacitor 16, so that voltage Vpp increases by small steps and reaches a determined value that comparator 32 will have time to detect to stop oscillator 30.

When voltage Vpp exceeds value Vdd+Vt, comparator 32 switches and stops oscillator 30. Capacitor 16 is then discharged progressively by the activations of the word lines, until voltage Vpp becomes again lower than Vdd+Vt, in which case oscillator 30 is reactivated to recharge capacitor 16.

To obtain other values of Vpp, a reference voltage is supplied to comparator 32 instead of voltage Vdd, and elements R and D7 are replaced with a resistive bridge.

Preferably, signal $CK_L^*$ is slightly delayed with respect to signal CK. The delay of the falling edges of signal $CK_L^*$ with respect to the rising edges of signal CK avoids that a delay in rendering transistor MP nonconductive causes an untimely discharge of capacitor 16 towards node C which reaches its low value. The delay of the rising edges of signal $CK_L^*$ with respect to the falling edges of signal CK limits the excursion of node C above value Vpp, ensuring that transistor MP is on before node C is urged to its high value.

Such a delay can be obtained by a succession of inverters providing signal $CK_L^*$ from signal CK.

The present invention has been described in relation with a CMOS technology in which it is desired to limit the gate voltages of the transistors, especially of the N-channel transistors. However, the booster circuit according to the present invention can be used in conventional technologies which tolerate high gate voltages, in which case limiting diodes D4 and D5 can be omitted.

By inverting the polarities of the diodes, transistors and supply voltages, a circuit providing a voltage Vpp which is more negative than ground potential GND is obtained. This is possible, in particular, due to the fact that the booster circuit is isolated from its control signals CK and $CK_L^*$ by capacitors C1 to C3.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A booster circuit including:
    a first MOS transistor of a first conductivity type, a source of which is connected to a high voltage line;
    a second MOS transistor of a second conductivity type, a drain of which is connected to a first supply potential and a source of which is connected to a drain of the first transistor;
    a first capacitor connected between a gate of the first transistor and a reception terminal for a first clock signal;
    a second capacitor connected between a gate of the second transistor and the reception terminal of the first clock signal;
    a third capacitor connected between the drain of the first transistor and a reception terminal for a second clock signal, wherein the second clock signal is complementary to the first clock signal;
    a first one-way precharge means for precharging the first capacitor from the high voltage line, ensuring, during a precharge, that a voltage sufficient to turn on the first transistor is established between the source and the gate of said first transistor; and
    a second one-way precharge means for precharging the second capacitor.

2. The booster circuit of claim 1, wherein the first precharge means includes two diodes connected in series between the source and the gate of the first transistor and the second precharge means includes a diode connected between the drain and the gate of the second transistor.

3. The booster circuit of claim 1, further comprising means for limiting a gate voltage of the second transistor.

4. The booster circuit of claim 3, wherein the limiting means is a diode connected in an opposite polarity direction to the second precharge means.

5. The booster circuit of claim 1, further comprising a diode, connected in an opposite polarity direction to the first precharge means, for limiting a gate voltage of the first transistor.

6. The booster circuit of claim 1, wherein the high voltage line exhibits a high capacitance with respect to that of the third capacitor.

7. The booster circuit of claim 1, wherein the second clock signal exhibits at least one delayed edge with respect to a corresponding edge of the first clock signal.

8. The booster circuit of claim 1, further comprising a comparator connected to stop an oscillator providing the first and second clock signals when the high voltage line reaches a predetermined threshold.

9. A booster circuit comprising:
    a first circuit including first and second transistors coupled between a high voltage line and a first supply potential;
    a second circuit including a first capacitor and a second capacitor coupled between a common first clock input terminal at first ends of the capacitors, and a respective, different one of the first and second transistors at second ends of the capacitors;
    a third circuit including first and second unilateral devices;
    said first unilateral device associated with said first transistor for precharging the first capacitor from the high voltage line, insuring, during a precharge, while the first clock signal is low that a voltage sufficient to turn on a first transistor is established between the source and the gate of said first transistor; and
    said second unilateral device associated with said second transistor and for precharging said second capacitor;
    wherein said first unilateral device comprises two diodes connected in series between the source and the gate of the first transistor and the second unilateral device includes a diode connected between the drain and the gate of the second transistor.

10. The booster circuit of claim 9 wherein both said first transistor and said second transistor are MOS transistors.

11. The booster circuit of claim 10 wherein said first MOS transistor is of first conductivity type and has its source connected to the high voltage line.

12. A booster circuit comprising:
    a first circuit including first and second transistors coupled between a high voltage line and a first supply potential;
    a second circuit including a first capacitor and a second capacitor coupled between a common first clock input terminal at first ends of the capacitors, and a respective, different one of the first and second transistors at second ends of the capacitors;
    a third circuit including first and second unilateral devices;

said first unilateral device associated with said first transistor for precharging the first capacitor from the high voltage line, insuring, during a precharge, while the first clock signal is low that a voltage sufficient to turn on a first transistor is established between the source and the gate of said first transistor; and said second unilateral device associated with said second transistor and for precharging said second capacitor;

wherein said second MOS transistor is of a second conductivity type.

13. The booster circuit of claim 12 wherein the drain of the second MOS transistor is connected to the first supply potential and the source of the second MOS transistor is connected to the drain of the first transistor.

14. The booster circuit of claim 9 wherein said first capacitor is connected between a gate of the first transistor and the first clock signal.

15. The booster circuit of claim 14 wherein said second capacitor is connected between a gate of the second transistor and the first clock signal.

16. The booster circuit of claim 15 further including a third capacitor connected between the drain of the first transistor and a reception terminal for a second clock signal.

17. The booster circuit of claim 16 wherein the second clock signal is complimentary to the first clock signal.

18. The booster circuit of claim 12 wherein said first unilateral device comprises two diodes connected in series between the source and the gate of the first transistor and the second unilateral device includes a diode connected between the drain and the gate of the second transistor.

19. The booster circuit of claim 9 further comprising an additional diode for limiting the gate voltage of the second transistor.

20. The booster circuit of claim 19 wherein the additional diode is connected in parallel but opposite polarity to the diode of the second unilateral device.

21. The booster circuit of claim 16 wherein the high voltage line exhibits a high capacitance with respect to that of the third capacitor.

22. The booster circuit of claim 9 further including a third capacitor connected between the drain of the first transistor and a second clock signal that is complementary to the first clock signal.

23. The booster circuit of claim 22 wherein the first clock signal has an edge and the second clock signal exhibits at least one delayed edge with respect to the edge of the first clock signal.

24. The booster circuit of claim 23 further comprising a comparator connected to stop an oscillator providing the first and second clock signals when the high voltage line reaches a predetermined threshold.

25. A booster circuit comprising:

a first MOS transistor means of a first conductivity type, a source of which is connected to a high voltage line;

a second MOS transistor means of a second conductivity type, a drain of which is connected to a first supply potential and a source of which is connected to a drain of the first transistor;

a first capacitor means connected between a gate of the first transistor means and a reception terminal for a first clock signal;

a third capacitor means connected between the drain of the first transistor means and a reception terminal for a second clock signal, wherein the second clock signal is complementary to the first clock signal;

a first one-way precharge means for precharging the first capacitor means from a high voltage line, ensuring, during a precharge while the first clock signal is low, that a voltage sufficient to turn on the first transistor means is established between the source and the gate of said first transistor means; and a second one-way precharge means for precharging the second capacitor.

26. The booster circuit of claim 25, wherein the first precharge means includes two diode means connected in series between the source and the gate of the first transistor means and the second precharge means includes a diode means connected between the drain and the gate of the second transistor means.

27. The booster circuit of claim 25, further comprising means for limiting a gate voltage of the second transistor means.

28. The booster circuit of claim 27, wherein the limiting means is a diode means connected in an opposite polarity direction to the second precharge means.

29. The booster circuit of claim 25, further comprising a diode means, connected in an opposite polarity direction to the first precharge means, for limiting a gate voltage of the first transistor means.

30. The booster circuit of claim 25, wherein the high voltage line exhibits a high capacitance with respect to that of the third capacitor means.

31. The booster circuit of claim 25, wherein the second clock signal exhibits at least one delayed edge with respect to a corresponding edge of the first clock signal.

32. The booster circuit of claim 25, further comprising a comparator means connected to stop an oscillator means providing the first and second clock signals when the high voltage line reaches a predetermined threshold.

* * * * *